(12) United States Patent
Levy et al.

(10) Patent No.: US 8,360,348 B2
(45) Date of Patent: Jan. 29, 2013

(54) METHOD AND APPARATUS FOR RECYCLING CARPET

(76) Inventors: Frank Levy, Quoque, NY (US); Sergio Dell'Orco, Capalle (IT)

( * ) Notice: Subject to any disclaimer, the term of this patent is extended or adjusted under 35 U.S.C. 154(b) by 224 days.

(21) Appl. No.: 12/806,454

(22) Filed: Aug. 12, 2010

(65) Prior Publication Data
US 2012/0037734 A1 Feb. 16, 2012

(51) Int. Cl.
*B02C 19/00* (2006.01)
(52) U.S. Cl. .............. 241/24.19; 241/186.35; 241/223; 241/DIG. 38
(58) Field of Classification Search .............. 241/223, 241/189.1, 186.35, 100, DIG. 38, 242, 24.19
See application file for complete search history.

(56) References Cited

U.S. PATENT DOCUMENTS

| | | | |
|---|---|---|---|
| 3,579,744 | A | 5/1971 | Menzies, Jr. |
| 3,797,073 | A | 3/1974 | Fairfield |
| 4,028,159 | A | 6/1977 | Norris |
| 4,404,710 | A | 9/1983 | Wood |
| 4,520,530 | A | 6/1985 | Pinto |
| 4,586,218 | A | 5/1986 | Pinto |
| 4,599,766 | A | 7/1986 | Wirth |
| 4,615,080 | A | 10/1986 | Wirth |
| 4,657,444 | A | 4/1987 | Pinto |
| 4,661,025 | A | 4/1987 | Pinto et al. |
| 4,682,388 | A | 7/1987 | Pinto |
| 4,694,538 | A | 9/1987 | Pinto et al. |
| 4,734,957 | A | 4/1988 | Lenzen |
| 4,769,873 | A | 9/1988 | Pinto |
| 4,864,693 | A | 9/1989 | Pinto et al. |

(Continued)

FOREIGN PATENT DOCUMENTS

| | | |
|---|---|---|
| DE | 3032477 A | 3/1981 |
| DE | 4228301 A1 | 4/1993 |

(Continued)

OTHER PUBLICATIONS

RD 388013, Anonymous.

(Continued)

*Primary Examiner* — Mark Rosenbaum
(74) *Attorney, Agent, or Firm* — Thomas A. O'Rourke; Bodner & O'Rourke, LLP

(57) ABSTRACT

The present invention is directed to an apparatus and method for separating carpet fibers from a backing material to which said fibers are secured. The apparatus includes a belt for driving a carpet strip having one or more backings and one or more fibers secured on a face of said backing into the operative part of the device. There are a pair of rollers that are adapted to receive the carpet strip from said belt, and pass the carpet strip to a dish plate. The dish plate has an edge extending upwardly from the dish plate. The face of the carpet having the fibers contacts the edge after the carpet passes through the rollers. The edge of the blade holds the carpet presenting it to the main drum. The main drum rotates downwards and has a plurality of pins that shred the carpet backing and tear apart and free the face carpet fibers from the backing fibers. The face fibers pass to a receptacle for recycling. The torn backing fibers, being usually longer and lighter than the face fibers, remain within the pins of the drum and are transported towards the back end of the machine and fall in a different receptacle for recycling.

23 Claims, 2 Drawing Sheets

U.S. PATENT DOCUMENTS

| | | | |
|---|---|---|---|
| 4,968,188 | A | 11/1990 | Lucassen |
| 5,016,324 | A | 5/1991 | Konig |
| 5,022,122 | A | 6/1991 | Clement |
| 5,169,870 | A | 12/1992 | Corbin |
| 5,230,473 | A | 7/1993 | Hagguist |
| 5,457,197 | A | 10/1995 | Sifniades |
| 5,491,186 | A | 2/1996 | Kean et al. |
| 5,497,949 | A | 3/1996 | Sharer |
| 5,515,577 | A | 5/1996 | Pinto et al. |
| 5,518,188 | A | 5/1996 | Sharer |
| 5,535,945 | A | 7/1996 | Sferrazza |
| 5,586,365 | A | 12/1996 | Leifeld et al. |
| 5,623,749 | A | 4/1997 | Leifeld et al. |
| 5,656,757 | A | 8/1997 | Jenczewski |
| 5,681,952 | A | 10/1997 | Sifniades |
| 5,701,939 | A | 12/1997 | Pinto et al. |
| 5,704,104 | A | 1/1998 | Bacon et al. |
| 5,722,603 | A | 3/1998 | Costello et al. |
| 5,926,918 | A | 7/1999 | Snell et al. |
| 5,950,282 | A | 9/1999 | Pinto |
| 5,952,660 | A | 9/1999 | Kip et al. |
| 6,029,916 | A | 2/2000 | White |
| 6,059,207 | A | 5/2000 | Costello et al. |
| 6,061,876 | A | 5/2000 | Rowe |
| 6,126,096 | A | 10/2000 | Robinson |
| 6,138,326 | A | 10/2000 | Pinto |
| 6,159,882 | A | 12/2000 | Kean et al. |
| 6,263,545 | B1 | 7/2001 | Pinto |
| 6,276,028 | B1 | 8/2001 | Pinto |
| 6,296,795 | B1 | 10/2001 | Buck |
| 6,305,920 | B1 | 10/2001 | Kean et al. |
| 6,378,179 | B1 | 4/2002 | Hirsch |
| 6,379,489 | B1 | 4/2002 | Goulet et al. |
| 6,398,138 | B1 | 6/2002 | Robinson |
| 6,589,294 | B2 | 7/2003 | Hortel et al. |
| 6,598,814 | B2 * | 7/2003 | Bascom et al. ............. 440/88 F |
| 6,752,336 | B1 | 6/2004 | Wingard |
| 6,814,826 | B1 | 11/2004 | Bell |
| 7,094,309 | B2 * | 8/2006 | Schneider .................... 156/296 |
| 2003/0075824 | A1 | 4/2003 | Moore, Jr. et al. |
| 2003/0111606 | A1 | 6/2003 | Berghmans et al. |
| 2004/0088829 | A1 | 5/2004 | Atkinson |
| 2008/0128933 | A1 | 6/2008 | Przybylinski et al. |

FOREIGN PATENT DOCUMENTS

| | | |
|---|---|---|
| JP | 05132825 A | 5/1993 |
| JP | 2001 062832 A | 3/2001 |
| SU | 411049 A | 6/1974 |
| WO | WO 0131096 A1 | 5/2001 |
| WO | WO 03060165 A1 | 7/2003 |
| WO | WO 2004003237 A1 | 1/2004 |

OTHER PUBLICATIONS

Appendix A, Descriptions of the 25 Case Studies, pp. A-1-A-118 from Lernpert, R. J. et al., Next Generation Environmental Technologies: Benefits and Barriers, Santa Monica, Calif. RAND Corporation, MR-1682-OSTP, 2003. As of Dec. 7, 2010: http://www.rand.org/pubs/monograph_reports/MR1682.

Background Document for the Final Comprehensive Procurement Guideline (CPG) III and Final Recovered Materials Advisory Notice (RMAS) III, copyright 1999, U.S. Environmental Protection Agency, Office of Solid Waste, EPA-530-R-00-002.

Bally Ribbon Mills, Glossary of Common Textile Terms, "Selvage" definition, copyright Dec. 2010.

Carpet America Recovery Effort (CARE) Annual Report 2003, copyright Apr. 2004, pp. 1-28. As of Dec. 7, 2010: http://www.carpetrecovery.org/pdf/annual_report/03_CARE-annual-rpt.pdf.

Carpet America Recovery Effort (CARE) Annual Report 2004, copyright May 2005. As of Dec. 7, 2010: http://www.carpetrecovery.org/pdf/annual_report/04_CARE-annual-rpt.pdf.

Carpet America Recovery Effort (CARE) Annual Report 2005, copyright May 2006, pp. 1-44. As of Dec. 7, 2010: http://www.carpetrecovery.org/pdf/annual_report/05_CARE-annual-rpt.pdf.

Carpet America Recovery Effort Annual Report, copyright 2002, pp. 1-29. As of Dec. 7, 2010: http://www.carpetrecovery.org/pdf/annual_report/02_CARE-annual-rpt.pdf.

Carpet Recycling Facts and Figures, copyright Jun. 2004, PowerPoint slide show, Fifth Annual World Conference, Duesseldorf, Germany.

Celanese Acetate, Complete Textile Glossary, "Selvage or Selvedge" definition, copyright 2001, Celanese Acetate, LLC.

Current Status of Product Stewardship for Carpet, copyright Feb. 2000, Midwestern Workgroup on Carpet Recycling. As of Dec. 7, 2010: http://www.greenbiz.com/sites/default/files/document/O16F29644.pdf.

DellOrco and Villani Designs New Fiber-Opening Concept, copyright Feb. 2001, Textile World web page. As of Dec. 7, 2010: http://www.textileworld.com/Articles/2001/February/New_Products/DellOrcoandVillani_Designs_New_Fiber-Opening_Concept.html.

Eighth Annual Conference on Recycling of Fibrous Textile and Carpet Waste, copyright May 2003, Conference Program, North West Georgia Trade & Convention Center, Dalton, GA, USA. As of Dec. 7, 2010: http://www.tfe.gatech.edu/recycle_conf/8th_5-03.pdf.

Fifth Annual Conference on Recycling of Fibrous Textile and Carpet Waste, copyright May 2000, Program, North West Georgia Trade & Convention Center, Dalton, GA, USA As of Dec. 7, 2010: http://www.tfe.gatech.edu/recycle_conf/5th_5-00.pdf.

Fourth Annual Conference on Recycling of Fibrous Textile and Carpet Waste, copyright May 1999, Northwest Georgia Trade & Convention Center, Dalton, GA, USA. As of Dec. 7, 2010: http://www.tfe.gatech.edu/recycle_conf/4th_5-99.pdf.

Levy, F. J., et al., New Technology for Opening Textile Waste, Fifth Annual Conference on Recycling of Fibrous Textile and Carpet Waste, copyright May 2000, PowerPoint slide show, North West Georgia Trade & Convention Center, Dalton, GA, USA. As of Dec. 7, 2010: http://smartech.gatech.edu/bitstream/handle/1853/10776/5th_15_levy.pdf; jsessionid=E0727497D40E8AABEC0305871EB914B6.smart1?sequence=1.

Muzzy, J., Recycling Post-Consumer Carpet, copyright 2005, Global Plastics Environmental Conference (GPEC 2005): Creating Sustainability for the Environment, Proceedings of a Society of Plastics Engineers (SPE) meeting held Feb. 23-25, 2005, Atlanta, Georgia, USA. As of Dec. 7, 2010: http://www.sperecycling.org/GPEC/GPEC2005/papers/Paper_04.pdf.

Ninth Annual Conference on Recycling of Fibrous Textile and Carpet Waste, copyright May 2004, Program, North West Georgia Trade & Convention Center, Dalton, GA, USA. As of Dec. 7, 2010: http://www.tfe.gatech.edu/recycle_conf/9th_5-04.pdf.

NTC Project SO3-PH01, Sustainability as a Source of Competitive Advantage, copyright Nov. 2005, National Textile Center Annual Report, pp. 1-10.

Recycling Interior Finish Materials—Carpet and Ceiling Tiles, copyright Mar. 2003, Public Works Technical Bulletin 200-1-17. As of Dec. 7, 2010: http://www.wbdg.org/ccb/ARMYCOE/PWTB/pwtb_200_1_17.pdf.

Recycling of Fibrous Textile and Carpet Waste, Final Program, copyright Jun. 1996, School of Textile & Fiber Engineering, Georgia Institute of Technology and Consortium on Competitiveness for the Apparel, Carpet and Textile Industries (CCATCI), Red Top Mountain Lodge, Cartersville, GA, USA. As of Dec. 7, 2010: http://www.tfe.gatech.edu/recycle_conf/1st_6-96.pdf.

Resource Conservation Challenge Strategic Plan, What Can You Save Tomorrow?, Five Year Plan, copyright Jun. 2005, pp. 1-20, United States Environmental Protection Agency. As of Dec. 7, 2010: http://www.epa.gov/osw/rcc/resources/strat-plan.pdf.

Second Annual Conference on Recycling of Fibrous Textile and Carpet Waste, copyright May 1997, The School of Textile & Fiber Engineering, Georgia Institute of Technology, Renaissance Atlanta Hotel Downtown, Atlanta, GA, USA. As of Dec. 7, 2010: http://www.tfe.gatech.edu/recycle_conf/2nd_5-97.pdf.

Seventh Annual Conference on Recycling of Fibrous Textile and Carpet Waste, copyright May 2002, Conference Program, North West Georgia Trade & Convention Center, Dalton, GA, USA. As of Dec. 7, 2010: http://www.tfe.gatech.edu/recycle_conf/7th_5-02.pdf.

Sham-Judd, M., Carpet Waste and Carpet Fiber Recycling: A Study of Open and Closed Loop Recycling Processes, date unknown, pp. 47-70. As of Dec. 7, 2010: http://www.p2pays.org/ref/09/08622.pdf.

Sixth Annual Conference on Recycling of Polymer, Textile, and Carpet Waste, copyright Apr. 2001, Conference Program, North West Georgia Trade & Convention Center, Dalton, GA, USA. As of Dec. 7, 2010: http://www.tfe.gatech.edu/recycle_conf/6th_4-01.pdf.

Source Report: ReEntry®, copyright Jul. 2006, Bentley Prince Street, 05SRC1114SS, pp. 1-2. As of Dec. 7, 2010: http://www.bentleyprincestreet.com/Documentation/bp-ReEntrySourceReport_05SRC1114SS.pdf.

The Carpet Industry's Sustainability Report, copyright 2003, The Carpet and Rug Institute, pp. 1-27. As of Dec. 7, 2010: http://www.carpet-rug.org/pdf_word_docs/03_CRI-Sustainability-Report.pdf.

Third Annual Conference on Recycling of Fibrous Textile and Carpet Waste, copyright Apr. 1998, Program. As of Dec. 7, 2010: http://www.tfe.gatech.edu/recycle_conf/3rd_4-98.pdf.

Wang, Y. et al., Recycling of Carpet and Textile Fibers, copyright 2003, pp. 697-725, Plastics and the Environment: A Handbook, Chapter 16, John Wiley & Sons, New York, USA. As of Dec. 7, 2010: http://www.prism.gatech.edu/~yw6/Fiberrecycling/Fiber%20Recycling%20Chapter%2016.pdf.

Wang, Y., Carpet Recycling Technologies, copyright Mar. 2006, pp. 1-11, School of Polymer, Textile and Fiber Engineering, Georgia Institute of Technology, Atlanta, GA, USA As of Dec. 7,2010: http://www.prism.gatech.edu/~yw6/Fiberrecycling/Recycling%20in%20Textiles%20YWang%20Ch6.pdf.

Wulfhorst, B. et al., Textile Technology, copyright Apr. 2006, pp. 74-84, Principles and Machinery for Yarn Production, ISBN 3-446-22963-9. As of Dec. 7, 2010: http://bilder.buecher.de/zusatz/14114694/14694935_lese_1.pdf.

Anonymous (1996). Separation Process. Kenneth Mason Publications Ltd. Research Disclosure Journal, 38813. Retrieved from http://www.researchdisclosure.com.

* cited by examiner

METHOD AND APPARATUS FOR RECYCLING CARPET

FIELD OF THE INVENTION

The present invention is directed to improvements in apparatus and methods for preparing carpet for recycling.

BACKGROUND OF THE INVENTION

Many industries are trying to become more environmentally friendly. As a result, many companies try to use more natural materials in their products. Others try to use recycled materials. One industry that has been very active in recycling has been the carpet industry. Many carpet companies use recycled PET (polyethylene terephthalate) from soda bottles to manufacture carpet fibers.

There is also a great deal of interest in recycling old carpet. At the present time, there is no uniform method of recycling carpet. Recycled carpet has a variety of uses including but not limited to composite lumber in the form of decking and sheets, tile backer board roofing shingles, railroad ties, automotive parts, carpet cushion, etc.

Carpet basically has two components, the face fiber and the backing structure to which the face fibers are secured. The face fiber is the part of the carpet on which the consumer walks. It is the top surface of the carpet. There are four common face fibers in use today. These are Nylon 6, Nylon 6.6, polypropylene (also called olefin) and polyester. Each of the face fibers has completely different properties (of the listed), which is why each of the types of face fibers must be separated from other different face fibers. The backing to where the face fibers are secured is usually a different material. Typical backing materials include polyvinyl chloride, latex and polypropylene.

At the present time, most recycling processes used for carpet try to recycle the face fibers. It is much more difficult to deal with the backing. The backing is usually composed of one or two polypropylene scrims and usually an adhesive present in addition to the backing material itself Each of these materials are frequently made from different polymeric materials that are difficult to recycle together and need to be separated.

In some recycling processes, the carpet is initially tested to identify the types of fibers. Once the recycler knows with which kind of carpet they are dealing, the face fiber is separated from the backing and the glue is stripped off the back of the carpeting. In one process described in U.S. Pat. No. 5,898,063, nylon polymers or nylon fibers are dissolved in a solvent at, at least, the dissolution temperature of the nylon in the solvent. The solvent containing the dissolved nylon is then removed from the remainder of the solid residue. Last, the solvent nylon solution is cooled to precipitate and recover the nylon. There are other types of chemical carpet recycling processes, including those shown in U.S. Pat. No. 7,067,613 to Mauldin, U.S. Pat. No. 6,610,769 to Blanpain and U.S. Pat. No. 6,379,489 to Goulet. Besides chemical recycling processes, there are shredding methods where shredded carpet is melted to be reused in another application. These patents include U.S. Published Patent Applications 2004/0048035 to Bailey, 2003/0075824 to Moore and U.S. Pat. No. 5,684,052 to Krishnan. Some other processes grind the carpet into small granules and then use air to separate the individual components into their constituent parts. These patents include U.S. Pat. No. 5,497,949 to Sharer, U.S. Pat. No. 7,635,099 to Meredith and U.S. Pat. No. 5,535,945 to Sferrazza. In U.S. Pat. No. 6,051,300 portions of the carpet are selected for grinding. These selected separate portions are melted after grinding for reuse.

A screen is used to separate ground particles of carpet materials in U.S. Pat. No. 6,250,575 to White and U.S. Pat. No. 6,155,020 to Deem. Costello et al., U.S. Pat. No. 6,059,207 is directed towards a process for recycling carpet selvage waste that employs a device for shearing the face fiber of a carpet using multiple beveling heads. The device contains four beveling heads encased in separate boxes each which include a rotating cutting device, a stationary cutting device and a vacuum hose. The beveling heads are situated at equal intervals and are placed so that they are adjacent to a central rotating drum that carries selvage waste along its outer surface. The device functions by contacting the moving selvage waste with the beveling heads to yield removed face fiber and a sheared selvage waste composite. The face fiber is ultimately removed to a face fiber storage bin through the vacuum lines attached to the respective box. (See column 9, lines 40-67).

Hoover, U.S. Published Patent Application 2009/0082476 is for a process where face yarn is shaved and the face shaved yarn is reduced in size. Contaminants are removed by mechanical screeners. The shaved face yarn is then melt filtered and then fiber spun.

OBJECTS OF THE INVENTION

It is an object of the invention to provide an apparatus that provides more complete separation of carpet backing from carpet fibers.

It is also an object of the invention to provide an apparatus that facilitates carpet recycling.

It is another object of the invention to provide a means for separating a backing made from polypropylene or other polymeric composition from carpet fibers of nylon or other fibrous polymeric material.

It is a further object of the invention to reduce unrecycled carpet materials.

It is still another object of the invention to increase the recyclability of carpet materials.

SUMMARY OF THE INVENTION

The present invention is directed to an apparatus for preparing one or more sections of carpet for recycling. The apparatus of the present invention permits a carpet strip to be separated into its backing component and its fiber component. By the term strip is meant a carpet section that is up generally up to 72" wide and any length desired. The width of the carpet used in the present invention is only limited by how wide the cylindrical roller or drum is. One of the benefits of the present invention is that the old carpet need not be cut into fairly small pieces in order to recycle it. The carpet has a backing material that is made of a first polymeric thermoplastic material and has fibers of a second polymeric thermoplastic material extending from the backing. Although the first and second material may be the same polymeric thermoplastic material, the more usual situation is where the first and second materials are different thermoplastic materials and therefore more difficult to separate from each other. In addition, blends of the two different polymeric materials, such as nylon and polypropylene do not have the same types of uses as polypropylene and nylon would have separately. As a result, there is a greater market for the individual components than for the blend. In addition, some of the polymeric materials are incompatible with each other and therefore blends of these materials are not marketable as recycled polymers. In one embodiment of the invention, the first carpet material is polypropylene. Polypropylene, while it can be used as a carpet fiber, does have particular application as a backing material.

Secured to the backing material by any suitable means including but not limited to heat bonding or an adhesive is a fiber that constitutes the pile of the carpet. This pile may be a length of fiber that has one end secured to the backing and the other end extending upwardly therefrom or the fiber may be a length of fiber that is folded over so that it is in the form of two lengths connected at a base portion. The two lengths are secured at the base portion to the backing where there is a fold at the base. The fiber may also be secured to the backing in any suitable manner. The carpet backing is the structure that holds together all the single lengths of fiber that form the pile of the carpet. The fiber that is attached to the backing is preferably a nylon material but could be another type of material such as polyethylene terephthalate or other carpet material. The term nylon material includes but is not limited to nylon 6 and nylon 6.6 or blends thereof.

The carpet strip is preferably placed face down on the feeder belt or feed in belt of the device of the present invention. By face down is meant that the carpet fibers attached to the backing are positioned closer to the surface of the feeder belt than the backing. The feeder belt drives the carpet strip to a first roller, which is positioned above the belt. This roller holds the carpet in position on the belt as the carpet is passed into the device of the present invention. The first roller is preferably positioned above one of the rollers of the feeder belt so that the two rollers can keep the carpet strip from rising above the surface of the belt during belt travel. The two rollers help also to hold the carpet while the pins of the main drum tear the carpet apart and free the face pile fibers from the fibers of the backing structure. From the belt the carpet strip is passed to a pair of nip rollers that drive the leading edge of carpet strip to the edge of a dish plate. This edged may be a sharp edge if desired. The nip rollers pull the carpet from the feeder belt to the dish plate. The top nip roller is preferably a floating roller meaning that it can be adjusted to accommodate different thicknesses of carpet and hold the carpet with an adjustable pressure operated by two air cylinders positioned one on each side of the machine. Once set to the desired height and pressure in one embodiment, the upper of the two nip rollers may be secured in that position.

The dish plate has an upper edge which the fiber side of the carpet passes. The angle of the upper edge is preferable less than about 30°, more preferably less than about 20° and most preferably less than about 15° The dish plate has a top surface that is curved to conform generally to the curve of the circumference of the upper nip roller. The carpet fibers contact the surface of the curve on the dish plate as the carpet strip passes from the nip rollers. As the carpet is driven up the face of the curved portion of the dish plate by the nip rollers, the first end of the carpet strip reaches the top edge of the dish plate and is aggressed by the pins of the main drum that tear the carpet and free the face pile fibers from the fibers of the backing structure. The main drum is provided with a plurality of pins. These pins extend upwardly from the outer surface of the drum. As the main drum rotates downwards from the top edge of the dish plate about its axis, the pins push down the carpet backing around the top edge of the dish plate. The close tolerances of the top edge, the upper nip roller and the main drum's pins, make possible for the pins to shred and tear apart the whole structure of the carpet, thus separating a significant percentage of the carpet fiber from the backing. In some instances the fibers when separated from the backing material have as little as 5-10% of backing and adhesive material with the carpet fibers which is significantly better than is typically obtained. Similarly the backing that is separated from the carpet fibers may only have as little as 10% carpet fiber present with the backing material separated from the fibers.

The face carpet fibers separated from the backing fibers by the high speed of the pins of the drum generally fly away tangentially to the drum and drop by gravity into a suitable receptacle where they can be collected for recycling. The main drum preferably rotates at a high speed. Preferably the drum rotates at about 525 RPM's. The receptacle may be provided with one or more sidewalls that are hinged or flexible to permit the opening area of the receptacle to be enlarged to facilitate collection of the fibers.

The receptacle may be a belt that removes the fibers away from the device for further processing. The apparatus of the present invention is preferably provided with a suitable guide to assist in directing the fibers to the receptacle. There may also be a guide that directs the remainder of the carpet strip into contact with the pins extending outwardly from the main drum as the drum rotates. In a preferred embodiment, the guides may be combined into a single guide. The combined guide of the present invention, broadly speaking, is in the form generally of an inverted V in cross section. The apex or point of the inverted V is an edge preferably extending from the region adjacent, from one side of the main drum to the opposite side of the main drum. The V has two legs extending generally downwardly from the apex. The first leg has a generally curved profile and the curve follows the general curve of the circumference of the main wheel drum. The position of the guide is adjustable so that the surface of the curved guide leg that is adjacent the main drum can be moved closer or further away from the main drum to increase or decrease the separation and removal of pile fiber that fly away tangentially to the main drum from the backing fibers that continue to turn inside the pins of the main drum towards the back end of the machine (the closer the edge of the guide is to the drum, the higher quantity of pile fiber can be removed). This adjustment causes as a secondary effect that bringing the edge of the guide closer to the drum increases the percentage of undesired backing fiber contaminating the pile fiber, therefore the user of the machine will have to decide the best compromise on the distance of the guide from the main drum for his needs.

The opposite leg of the guide is positioned so that one end, the end opposite the apex is in or nearly in the receptacle so that the shredded fiber may be deposited from the knife blade into the receptacle. In a preferred embodiment, the second leg of the V extends partially into the receptacle where it contacts an inner surface of the sidewall of the receptacle. Because the guide is adjustable with respect to the proximity of the first curved leg to the surface of the main drum, the second leg also moves as a result of this adjustability. This motion is such that the receptacle is preferably provided with a flexible side wall or a hinged sidewall to accommodate the movement of the guide.

The receptacle may be any suitable container for receiving the shredded pieces of carpet fiber. Alternatively, the fiber may drop onto a channel or belt where the fiber pieces are passed from the belt to a receptacle or other packing means for recycling. Similarly, the fibers may be processed directly at the facility where the carpet is treated by the apparatus of the present invention.

After the fibers are stripped from the backing, the pins on the main drum cause the backing to be directed around the drum where the backing reaches a negative pressure roller (also known as a condenser cage), which holds the shredded backing to its outer surface by the internal vacuum. As the negative pressure roller rotates, the shredded backing is transported to a pair of rollers. One roller is a drive roller; the second roller causes the shredded backing to pass onto a belt where it can be transported away from the device for further processing. The condenser cage also assists in removing dust generated by the process. This dust enters the cage through the orifices in the surface and the negative pressure in the cage causes the dust to be removed.

A second guide positioned on the other side of the main drum. This guide cuts off the wind generated by the rotation of the main drum and the pins on the main drum and forces the backing to fall on the negative pressure roller or condenser cage.

The negative pressure roller is preferably a roller with a plurality of orifices in the surface of the roller that are preferably smaller than the sizes of the pieces of the shredded carpet backing. The negative pressure in the roller causes the backing particles to adhere to the surface of the drum because of the vacuum present in the roller. This negative pressure causes the backing particles to fall from the area where the second guide meets the main drum onto the negative pressure roller. As particles of backing go along the negative pressure roller they are held in place by the vacuum until they are removed from the negative pressure roller and dropped onto the belt for removal and recycling. The air sucked through the holes of the perforated surface of the negative pressure roller removes a great amount of dust, latex and calcium carbonate (all components of the carpet backing) generated during the tearing action of the pins of the main drum on the carpet. This dusty air is then processed and cleaned through a dedicated filter (not shown in the enclosed drawings).

DETAILED DESCRIPTION OF THE INVENTION

Figure 1:
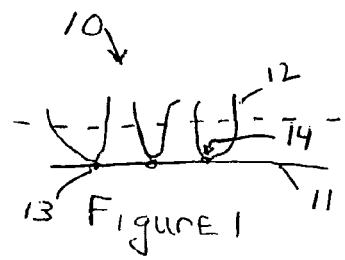
FIG. 1 shows a representative example of a side view of a carpet section.

FIG. 1 shows a representative example of a side view of a carpet section. The section 10 has a backing 11 to which the carpet fibers 12 or pile are secured by adhesive 13 or other suitable means. The fibers can have any suitable length extending from the backing as desired by the carpet manufacturer in response to the consumer needs or desires. In some carpets, the fibers may form a tight nap due to the number of fibers per square inch. In other carpets, the fibers may be longer and more flexible as in a shag type carpet.

The carpet section of FIG. 1 shows a single strand of fiber folded about a center section 14 and secured to the backing 11 at the center section. These small pieces of fiber are sometimes called a "U". It will be appreciated by those skilled in the art that other types of arrangements of the fiber are also possible. For example, one end of a fiber strand may be secured to the backing and the other opposite end of the fiber strand extends outwardly from the backing. The carpet section may be a full piece of carpet or it may be strips that have been cut from a carpet.

The carpet that may be used in the present invention is preferably a carpet that has the backing made from one thermoplastic polymeric material and the fibers made from a different polymeric thermoplastic material although prior to being placed on the belt of the device of the present invention, the face fibers could have been trimmed as close to the backing as possible by conventional shearing devices. However, it is not required that the face fibers be pre-trimmed in the present invention. In the conventional process the face fibers are recycled separately from the remainder of the carpet. In conventional systems, the backing with the residue of fiber secured thereto is recycled as a composite material; however, this composite material has limited use in recycling as the backing is typically made from a polymeric thermoplastic method that is different from the pile fibers.

Figure 2:
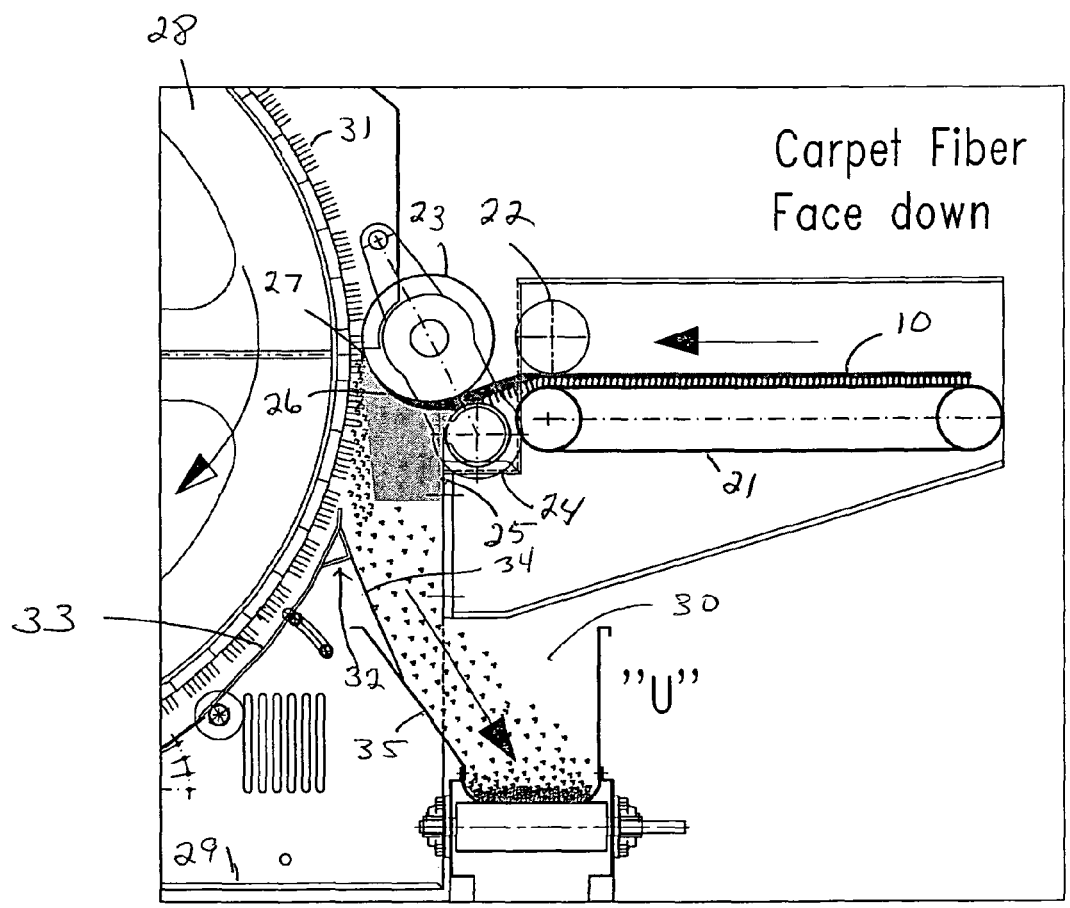
FIG. 2 is a side view of a carpet fiber shredding portion of the apparatus of the present invention.

As depicted in FIG. 2, the apparatus 20 of the present invention includes a belt 21 that may be any suitable length or width. The carpet section may be any suitable length and width as long as it fits on the belt of the apparatus. The carpet section used in the present invention is not limited to narrow strips but rather fairly large sections may be fed into the device. The carpet 10 to be recycled can be the entire original carpet or could have already been initially trimmed so that any long fibers on the upper surface of the carpet are removed leaving only the base or backing and a short section of the fiber extending upwardly from the backing. The carpet section to be recycled is positioned on the feed belt in a face down position with the backing 11 configured upwardly on the feed belt and the fiber portion of the carpet 12 contacting the feed belt 21. At one end of the belt there is a pressing roller 22 that keeps the carpet section positioned on the feed belt. The pressing roller 22 is preferably positioned above one of the belt rollers at the end of the section of belt. The belt drives the carpet section from the belt to a pair of rollers. These rollers are nip or feed rollers. There is a top feed roller 23 and a bottom feed roller 24. The top 23 and bottom feed roller 24 direct the carpet section to a dish feed 25. The dish feed preferably has a length similar to the length of the main drum from about one end to the other end of the main drum but it does not have to be the full length of the drum. The dish feed 25 may be in the form of a block or dish plate with a curved surface 26 that generally conforms to the curve of the circumference of the upper feed roller 23. At the upper edge of the dish feed 25 there is a an edge 27. The tip of the blade has a sharp edge. At the edge of the dish feed the carpet is forced by the downward rotation of the main drum 28 to move over the edge of the dish feed and travel down toward the base 29 of the apparatus. The main drum preferably rotates at a fairly high speed in the order of more than 300 rpm's and more preferably more than 400 rpm's and most preferably 500-600 rpm's. The main drum 28 is in the form of a cylinder of any suitable length and diameter. The main drum has a plurality of pins extending outwardly from the surface of the main drum. The main drum can also be adjusted in distance from the edge 27, so that its pins grab onto the backing 11 and shred and tear apart the structure of the carpet backing, thus freeing the pile fibers such as the "U's". The free pile fibers are thrown down tangentially by the pins of the drum and fall from the area of the edge toward the receptacle 30 that receives the fibers. The receptacle 30 can be any configuration, in one embodiment the receptacle can be in the form of a conveyor type belt that shredded fibers fall onto and are removed by the motion of the belt.

The longer shredded backing fibers remain closer to the pins of the drum and are dropped to between the rear surface of the dish feed 25 and a guide 32. The guide 32 has a first surface 33 that may be curved to generally conform to the curve of the circumference of the main drum 28. The curved surface of the first leg 33 of the guide keeps the shredded backing fibers in position on the pins 31 of the main drum 28.

The second surface 34 of the guide is angled towards the receptacle that received the fiber debris stripped from the backing. This guide is adjustable so that it can be moved closer to the main drum 28 or further away depending on the quantity of pile carpet fiber that is to be separated from the carpet backing fiber. As the guide moves closer to the main drum or further away as required, the second surface 34 of the guide is also moving thereby narrowing or widening the opening area of the receptacle 30 receiving the carpet fiber debris. Because of this motion the receptacle has at least one side wall 35 that is angled as shown. In a more preferred embodiment, this side wall is hinged so that the opening of the receptacle can be adjusted as the guide is adjusted in response to the desired pile fiber/carpet backing fiber separation.

Figures 3, 4:
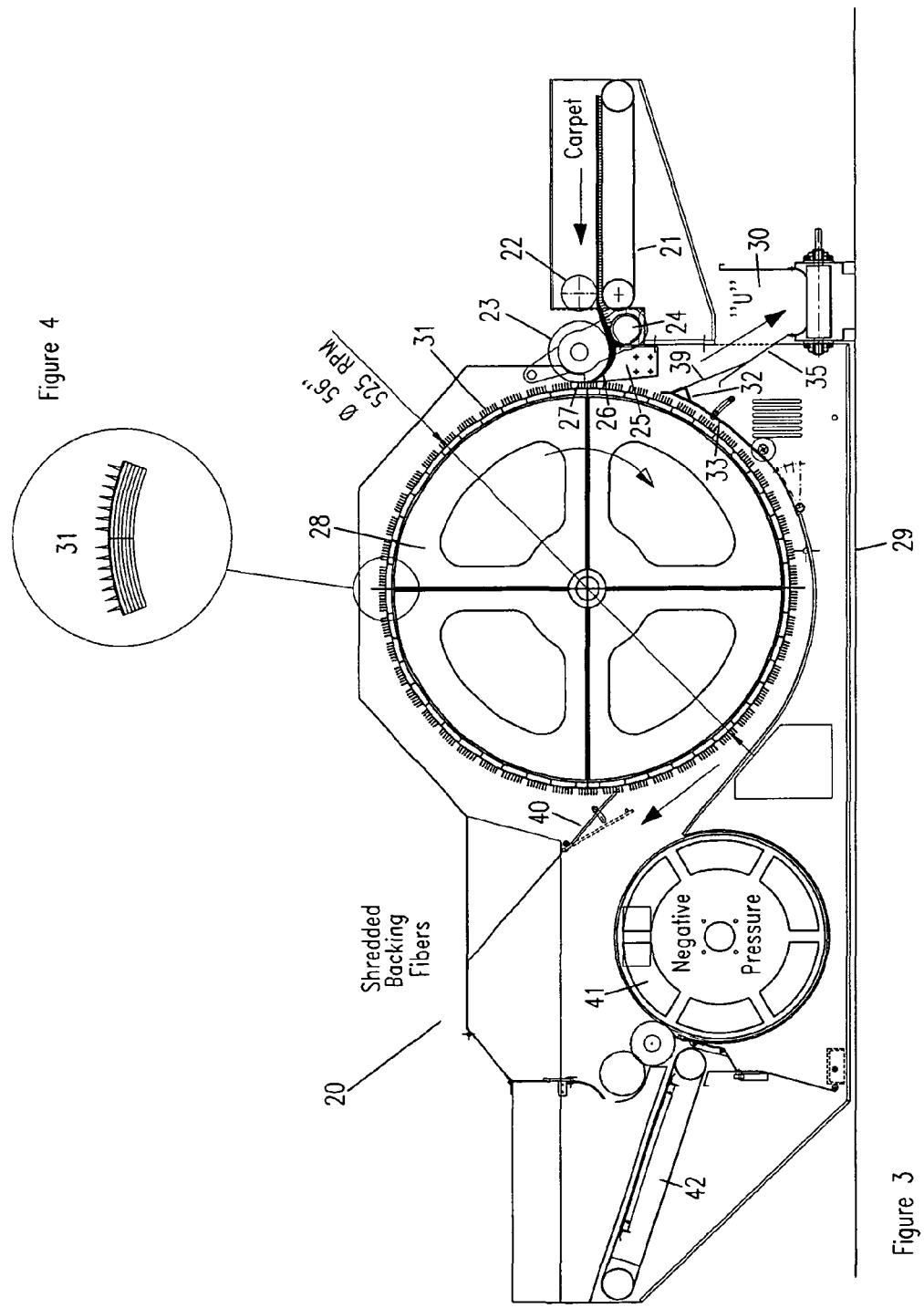
FIG. 3 is a side view of the apparatus of the present invention.
FIG. 4 is an enlarged view of an example of the pins used on the main wheel of the apparatus of the present invention.

As the backing fiber 11 moves along the main drum 28, the pins 31 extending outwardly of the surface of the main drum 28 pull the backing along the outer surface of the main drum 28. As shown in FIG. 4, as the backing fiber is moved by the pins on the drum the backing fiber is transported to a guide bar 40 that breaks off the circumferential wind generated by the rotating pins and causes the backing to be removed from the pins. The guide bar 40 is adjustable so that it can be made closer to or farther away from the pins 31 on the main drum 28. The shredded pieces of backing fall onto the outer surface of a negative pressure roller 41 or a condenser cage. The condenser could be located as shown in the existing drawing, but may also be located as a separate machine in a different location. The backing at this stage is substantially backing material with a small quantity of pieces of the fiber "U's". The negative pressure roller has a plurality of orifices in the outer surface of the roller. A vacuum on the surface of the roller in the region of the orifices causes particles of the shredded backing to adhere to the outer surface of the negative pressure 41 as it rotates. The shredded backing is transported to a second belt where the backing is deposited on the belt 42 and transported to a receptacle (not shown) for further processing.

The air sucked through the plurality of orifices in the outer surface of the negative pressure roller carries with itself a great amount of dust and crushed latex and calcium carbonate generated during the tearing action of the pins of the main drum on the carpet.

We claim:

1. An apparatus for separating carpet fibers from a backing material to which said fibers are secured comprising:
   a) a feed belt for driving a carpet strip having one or more backings and one or more fibers secured on a face of said backings,
   b) a pair of nip rollers, said nip rollers adapted to receive said carpet strip from said belt, and
   c) a dish plate, said dish plate having an edge, said face of said carpet having said fibers contacting said edge after said carpet passes through said nip rollers, said edge holding said carpet while pins of a main drum tear apart the carpet backing structure and separating said fibers from said backing, said fibers separated from said backing passing to a first receptacle for recycling, and
   d) a main drum, said main drum having a plurality of pins for receiving said backing as said strip passes over said edge of said dish plate, said backing being torn apart by said pins, said pins causing said torn backing fibers to be carried by said main drum towards a back end of the apparatus,
   e) a second receptacle for receiving said shredded backing fibers at said back end of the apparatus.

2. The apparatus according to claim 1 comprising a first guide member with a first guide portion for directing shredded carpet pile fibers into said first receptacle.

3. The apparatus according to claim 2 wherein said first guide member comprises a second guide portion for directing said backing into contact with said pins on said main drum.

4. The apparatus according to claim 3 wherein said first guide portion and said second guide portion of said first guide member form of an inverted V shape, said V shape having an apex.

5. The apparatus according to claim 4 wherein said second guide portion comprises a curve corresponding to the curve of the circumference formed by said pins on said main drum.

6. The apparatus according to claim 4 wherein the position of said second guide portion is adjustable relative to the distance away from an outer surface of said main drum.

7. The apparatus according to claim 6 wherein said backing shredded fiber is transported by said pins on said main drum to a second guide member where said backing shredded fiber is removed by said second guide member.

8. The apparatus according to claim 7 further comprising a negative pressure drum for receiving shredded backing material after it has been removed by said guide.

9. The apparatus according to claim 8 wherein said negative pressure drum transports shredded backing material to said second receptacle for recycling said backing material.

10. The apparatus according to claim 8 wherein said negative pressure drum transports said shredded backing material to a belt for transporting said backing material to said second receptacle for recycling said backing material.

11. The apparatus according to claim 10 wherein said first guide portion of said first guide member is configured to be adjustable along with said adjustable second guide portion.

12. The apparatus according to claim 11 wherein said receptacle for said carpet pile fibers has at least one hinged sidewall said opening in said sidewall thereby being adjustable.

13. The apparatus according to claim 12 wherein said dish plate has at least one surface that has a curve that corresponds to the curve of one of said nip rollers.

14. A method of separating carpet fibers from a backing material to which said fibers are secured comprising, placing a carpet strip containing said fibers and said backing on a feed belt where said backing is face up on said belt, and said fibers are closer to the surface of said belt than said backing, passing said carpet strip through a pair of nip rollers which force said carpet strip along a face of a dish plate, passing the fibers of said carpet strip over an edge on said dish plate which holds the carpet while the pins of a main drum tear apart the carpet and free the carpet pile fiber from the carpet backing fiber; transporting said separated carpet pile fibers to a first receptacle, positioning said backing on said pins extending from a surface of said main drum, transporting said backing on said main drum using a first guide, removing said backing on said main drum by a second guide, and transporting said shredded backing to a second receptacle.

15. The method according to claim 14 further comprising providing said first guide with a movable guide portion, and adjustably moving said movable guide portion of said first guide for directing separated carpet fibers into said first receptacle.

16. The method according to claim 15 further comprising providing said second guide with a movable guide portion, and adjustably moving said movable guide portion of said second guide for directing said backing into contact with said pins on said main drum.

17. The method according to claim 16 further comprising adjusting the position of said movable portion of said first guide with respect to said main drum for changing the desired quantity of said pile fibers to be removed from said backing.

18. The method according to claim 17 further comprising the step of directing said shredded backing to the surface of a negative pressure drum, said negative pressure holding shredded backing on said drum as said drum rotates.

19. The method according to claim 18 wherein said shredded backing is transported by said negative pressure drum to a belt.

20. The method according to claim 19 further comprising the step of transporting said shredded backing along said belt to said second receptacle.

21. An apparatus for separating carpet fibers from a backing material to which said fibers are secured comprising:
   a) a feed belt for driving a carpet strip having one or more backings and one or more fibers secured on a face of said backings,
   b) a pressing roller for retaining said carpet strip on said belt
   c) a pair of feed rollers, said feed rollers adapted to receive said carpet strip from said belt, and
   d) a dish feed, said dish feed having a dish plate, said dish plate terminating in an upper edge at an upper surface thereof, said face of said carpet having said fibers contacting said edge after said carpet passes through said feed rollers, said edge holding said carpet while the pins of the main drum tear apart the carpet backing structure separating said fibers from said backing, said fibers separated from said backing passing to a first receptacle for recycling, and
   e) a main drum, said main drum having a plurality of pins for receiving said backing as said strip passes over said edge of said dish plate, said backing being torn apart by said pins, said pins and a first guide causing said torn backing fibers to be carried by said drum towards a back end of the machine,
   f) a second guide, said second guide removing said shredded backing fibers from said pins on said main drum, and
   g) a second receptacle for receiving said shredded backing fibers.

22. A method of separating carpet fibers from a backing material to which said fibers are secured comprising, placing a carpet strip containing said fibers and said backing on a belt where said backing is face up on said belt, and said fibers are closer to the surface of said belt than said backing, passing said carpet between said belt and a pressing roller to retain said carpet strip in position on said belt; passing said carpet strip through a pair of feed rollers which force said carpet strip along a face of a dish plate, said dish plate having an edge on an upper surface, passing the fibers of said carpet strip over said edge of said dish plate, holding said carpet while the pins of a main drum tear apart and shred the carpet backing structure of said carpet strip separating said pile carpet fibers from said carpet backing fibers, transporting said separated pile carpet fibers to a first receptacle, transporting said carpet backing fibers on one or more pins extending from a surface of the main drum to a separating guide, directing said shredded backing to the surface of a negative pressure drum said negative pressure holding shredded backing fibers on said drum as said drum rotates, transporting said shredded backing fibers to a second receptacle.

23. The method according to claim 22 wherein said second receptacle is a delivery belt.

* * * * *